US010767367B2

(12) United States Patent
Krass

(10) Patent No.: US 10,767,367 B2
(45) Date of Patent: Sep. 8, 2020

(54) SLAT FOR A SLATTED ROOF OR A SLATTED WINDOW, AND A SLATTED ROOF OR SLATTED WINDOW HAVING SUCH A SLAT

(71) Applicant: KlimaSky GmbH, Friedrichshafen (DE)

(72) Inventor: Reinaldo Krass, Bad Homburg (DE)

(73) Assignee: KlimaSky GmbH, Friedrichshafen (DE)

( * ) Notice: Subject to any disclaimer, the term of this patent is extended or adjusted under 35 U.S.C. 154(b) by 445 days.

(21) Appl. No.: 15/322,892

(22) PCT Filed: Jun. 30, 2015

(86) PCT No.: PCT/EP2015/064773
§ 371 (c)(1),
(2) Date: Dec. 29, 2016

(87) PCT Pub. No.: WO2016/001183
PCT Pub. Date: Jan. 7, 2016

(65) Prior Publication Data
US 2017/0130454 A1      May 11, 2017

(30) Foreign Application Priority Data

Jul. 2, 2014   (DE) .................. 10 2014 212 867

(51) Int. Cl.
*E04B 7/16*     (2006.01)
*E04D 13/03*    (2006.01)
(Continued)

(52) U.S. Cl.
CPC .............. *E04B 7/163* (2013.01); *E04B 7/166* (2013.01); *E04D 3/06* (2013.01); *E04D 13/0325* (2013.01);
(Continued)

(58) Field of Classification Search
CPC .......... E04B 7/163; E04B 7/166; E06B 9/386; E06B 9/28; E06B 7/098; E06B 7/084;
(Continued)

(56) References Cited

U.S. PATENT DOCUMENTS 1,519,553 A  * 12/1924  Riker ...................... E06B 7/084
                                                                    109/16
3,008,403 A  * 11/1961  De Veire ................. E06B 7/084
                                                                    454/221
(Continued)

FOREIGN PATENT DOCUMENTS

| AU | 200032540 B2 | 8/2000 | |
| CH | 598440 A5 * | 4/1978 | ............. E04B 7/163 |

(Continued)

OTHER PUBLICATIONS

Abstract of DE 1020009052904 A1, May 2011.
(Continued)

*Primary Examiner* — Robert Canfield
(74) *Attorney, Agent, or Firm* — Ware, Fressola, Maguire & Barber LLP

(57) ABSTRACT

The invention relates to a slat (1) or a slatted roof (20) or a slatted window, comprising a light-permeable sheet-like covering element (2) having a longitudinal extent and width (b), wherein the width (b) is less than the longitudinal extent, and having an axis of rotation (5) which runs along the longitudinal extent of the slat (1) in order to pivot the slat (1) between a closed position and an open position. In order to allow a particularly flexible variation of the incoming sunlight entering a room (22) situated below the slatted roof (20) and in order to be able to set the desired temperature, climate control and brightness conditions in the room in a targeted manner, it is proposed that the slat (1) has at least one light-impermeable sheet-like shading element (6) having a longitudinal extent and a width (h), in which the (Continued)

Figure 10:
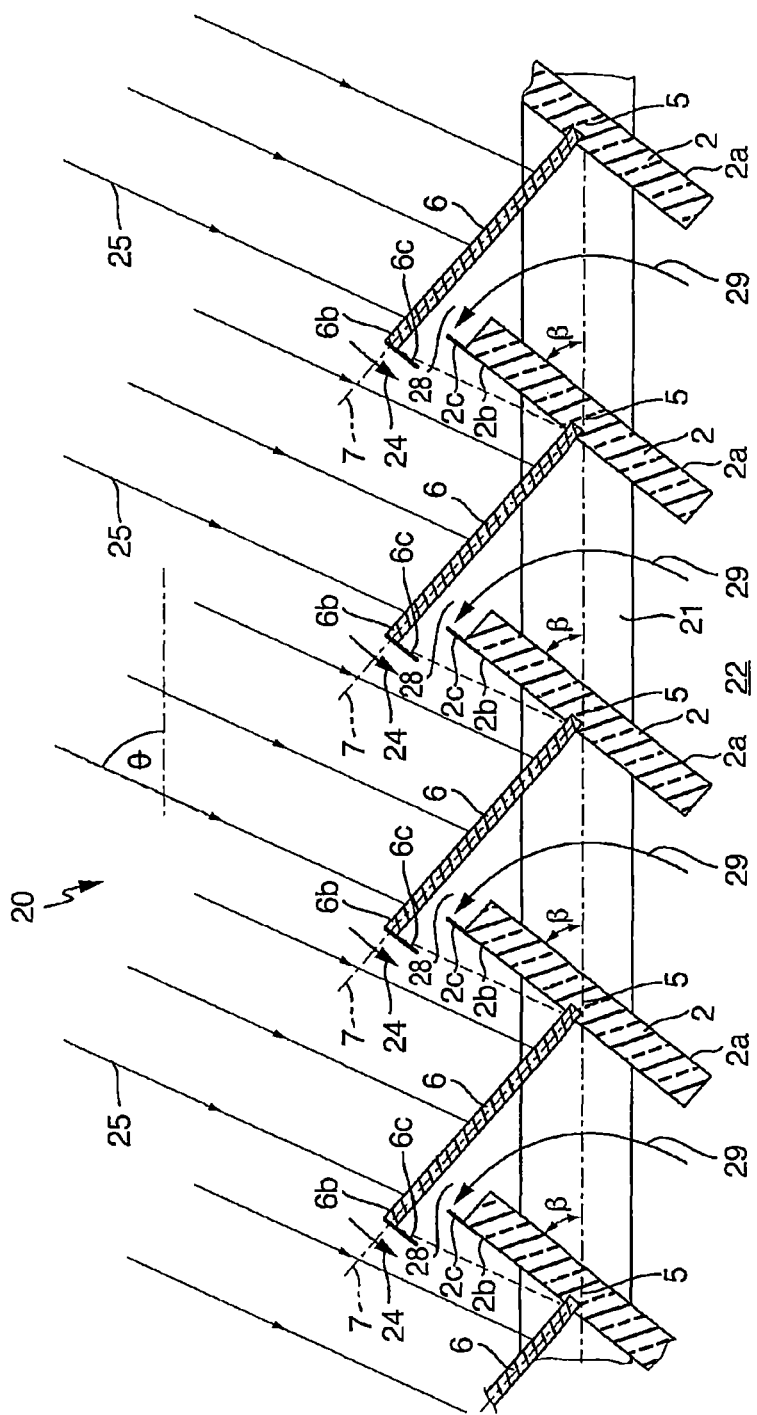

shading element extends with the longitudinal extent thereof along the longitudinal extent of the covering element (2), that it is arranged with a first longitudinal side (6a) on the covering element (2) and projects with a second longitudinal side (6b), opposite the first longitudinal side (6a), from the covering element (2), wherein the at least one shading element (6) is arranged in the areal extent thereof at an angle ($\alpha$) to the areal extent of the covering element (2). (FIG. 10).

15 Claims, 12 Drawing Sheets

(51) Int. Cl.
| | |
|---|---|
| *E06B 9/386* | (2006.01) |
| *E04F 10/10* | (2006.01) |
| *E06B 7/098* | (2006.01) |
| *E06B 9/28* | (2006.01) |
| *E04D 3/06* | (2006.01) |
| *E06B 7/084* | (2006.01) |
| *E04D 13/035* | (2006.01) |

(52) U.S. Cl.
CPC .......... *E04D 13/0351* (2013.01); *E04F 10/10* (2013.01); *E06B 7/084* (2013.01); *E06B 7/098* (2013.01); *E06B 9/28* (2013.01); *E06B 9/386* (2013.01); *Y02A 40/258* (2018.01); *Y02A 40/26* (2018.01)

(58) Field of Classification Search
CPC ... E04D 13/0325; E04D 13/0351; E04F 10/10
USPC ............... 49/74.1, 77.1, 92.1; 454/221, 358; 160/166.1, 167 R, 326
See application file for complete search history.

(56) References Cited

U.S. PATENT DOCUMENTS

| | | | | |
|---|---|---|---|---|
| 3,060,529 A | * | 10/1962 | Clay | ........................ E06B 7/084 160/88 |
| 4,005,662 A | * | 2/1977 | Kohn | ...................... E05G 7/004 109/16 |
| 4,095,369 A | * | 6/1978 | Posnansky | .............. A01G 9/222 47/22.1 |
| 4,527,355 A | * | 7/1985 | Numakami | .............. E04F 10/10 49/275 |
| 8,413,705 B2 | | 4/2013 | Castel | |
| 9,650,786 B2 | * | 5/2017 | Weaver | .................... E04B 7/163 |
| 2008/0093036 A1 | * | 4/2008 | Lin | .......................... E06B 9/386 160/236 |
| 2011/0162808 A1 | | 7/2011 | Castel | |
| 2015/0376901 A1 | * | 12/2015 | Partridge | ................. E04B 7/163 52/1 |
| 2016/0115688 A1 | * | 4/2016 | Weaver | .................... E04B 7/163 52/473 |
| 2016/0177575 A1 | * | 6/2016 | Ivic | ......................... E04F 10/10 52/302.1 |
| 2016/0211793 A1 | * | 7/2016 | Grimmeisen | ........... E04B 7/163 |
| 2019/0338528 A1 | * | 11/2019 | Torman | .................... E04F 10/10 |

FOREIGN PATENT DOCUMENTS

| | | | | | |
|---|---|---|---|---|---|
| DE | | 2453018 A1 | * | 5/1976 | ............. E04F 10/10 |
| DE | | 19828542 A1 | | 7/1999 | |
| DE | | 102009052904 A1 | | 5/2011 | |
| DE | | 202011102874 U1 | | 10/2011 | |
| DE | | 102010031714 A1 | | 1/2012 | |
| DE | | 202014101952 U1 | * | 6/2014 | |
| FR | | 2284747 | | 4/1976 | |
| FR | | 2676079 A1 | * | 11/1992 | |
| FR | | 2987061 A1 | * | 8/2013 | ............. E04B 7/163 |

OTHER PUBLICATIONS

Abstract of DE202011102874, Nov. 2016.
Abstract of DE102010031714A1, Jan. 2012.
Abstract of DE19828542A1, Jul. 1999.
Abstract of FR2284747A1, Apr. 1976.
Entire Machine Translation of DE 19828542 A1 dated Jan. 4, 2017.

* cited by examiner

SLAT FOR A SLATTED ROOF OR A SLATTED WINDOW, AND A SLATTED ROOF OR SLATTED WINDOW HAVING SUCH A SLAT

The invention relates to a slat fore slatted roof or a slatted window (so-called shutter windows). The slat comprises a light-permeable, sheet-like covering element having a longitudinal extant and a width, wherein the width is less than the longitudinal extent, and having an axis of rotation which runs along the longitudinal extent or the slat in order to adjust the slat between a rinsed position and an open position.

The invention also relates to a slatted roof or slatted window with a supporting structure and several slats arranged in parallel to each other, each of which can pivot on the supporting structure around an axis which runs along its longitudinal extent in order to adjust the slats between a closed position and an open position.

A wide variety of different slatted roofs and slatted windows are well known and have been commonly used for a long time. These have several slats running parallel to each other. Each slat can be made from en opaque or semi-transparent material. Opaque slats are Made from a variety of materials including metal, plastic or wood. Light-permeable slats can be made from glass or plastic, in particular from polycarbonate or polymethylmethacrylate (acrylic glass). The slats run with their longitudinal extent parallel to each other and can be pivoted individually or as a group around a rotating axis that runs along the longitudinal axis of each respective slat. The slats are connected via an operating mechanism to set the angle of inclination around their rotational axes.

Whilst slatted roofs usually have a horizontal areal extent and are positioned e.g. over terraces, balconies and conservatories, or as skylights, slatted windows usually have a vertical areal extent.

The discussion points below primarily refer to slatted roofs, however they also logically apply to slatted windows.

The mode of operation for slatted roofs with mainly opaque slats is based on the fact that, due to the changeable inclination of the slats, it is possible on the one hand to create ventilation, and on the other hand to regulate the amount and intensity of sunlight entering the room beneath the roof.

One disadvantage of these slatted roofs is that the opaqueness of the slats leads to considerable limitations. Particularly when it comes to protecting the room against atmospheric influences such as rain, hail, snow and wind, the slats must be put into their fu iv closed position, otherwise they will leak. However, due to the opaqueness of the slats, the room beneath the roof then becomes relatively dark, because sunlight is then unable to enter the room through the roof, particularly on days that are already dark anyway.

This is why there are also slatted roofs with slats made from e permeable material which are known from prior art Light-permeable slats have the advantage that the room beneath the roof can be protected against the elements with the slats in their fully closed position, but, due to the light-permeable properties of the slats, sunlight from outside can still enter the room. However, a disadvantage of this is that the room can heat up due to the sunlight coming through, in particular due to its level of infrared radiation. In this closed position, the heat cannot escape upwards out of the mom and this leads to heat building up under the slatted roof. And even when the slats are in their open position, in strong sunlight the room underneath would still heat up despite ventilation. Another drawback is the fact that regulating the intensity of light is not possible in practice, because the light-permeable properties of the slats mean that the corresponding room cannot be darkened. Furthermore, in sunlight, a glare effect can occur due to reflect sunlight, which can often be unpleasant.

Because of these problems, various measures have been suggested in prior art for light-permeable slats. These include, for example, a coating applied to at least part of the transparent material of the slat, which reflects infrared light. Another example is known from DE 10 2010 031 714 A1, in which a detachable shading material is fixed to the slats for the room which needs to be shaded. The slats in the case would then hardly be light-permeable at all. However, manually attaching the shading material to the inside of the slats is very laborious and time-consuming. The shading material must also be kept in a storage space in order to be able to fix it onto the slats from the inside at shot notice.

Another aspect to consider with conventional slatted roofs is their load bearing capacity. The slats in their closed state only have a limited load-bearing capacity due to their primarily horizontal, two-dimensional areal extent and their lack of rigidity, particularly with regards to bearing loads of snow. Therefore, in order to ensure these slatted roofs do not become damaged, they must be opened during heavy snowfall, meaning that the snow falls through to the room below.

For this reason, slatted roofs in prior art are partially supplied with slats that nave a stabilizing framework structure, for example made from aluminium, continuous casting profiles or similar, into which a covering element made from transparent or opaque material is then inserted (see DE 10 2010 031 714 A1). The individual slats then consist of the stabilizing framework structure and the covering element inserted into them. The makes the construction of the slats very complex, and above all, very heavy. This means that particularly stable and/or self-locking operating mechanisms may be required to adjust the rotation angle of the slats (see e.g. DE 10 2010 031 714 A1). In addition, the framework structure, which is made mostly of metal, creates an undesirable thermal bridge.

Based on the described prior art, this invention has the underlying task of developing and improving slats of the type mentioned at the beginning, so that on the one hand, when in their closed position, they should reliably protect against atmospheric influences, ensure that light can enter and have a good load-bearing capacity, as well as prevent the corresponding room from overheating as far as possible, and on the other hand, allow the Incoming sunlight to be varied particularly flexibly by means of pivoting in order to be able to selectively set the desired levels of temperature, climate and brightness in the corresponding room.

To fulfil this task, in accordance with this invention, based on the light-permeable slats of the type mentioned at the beginning, it is proposed that the slats have at least one flat shading element that is at least partially opaque with a longitudinal extent and a width, which covers at least a part of the longitudinal extent of the covering element with its own longitudinal extent, which is fixed to the covering element using its first longitudinal side, and which has a second longitudinal side, located opposite the first longitudinal side, that protrudes from the covering element, whereby the areal extent of the shading element is positioned at an angle to the areal extent of the covering element.

This invention makes a distinction between rays of sunlight which originate directly from the sun and lead to the room beneath the slatted roof becoming warmer when they filter through the covering elements of the slatted roof and into the room, and diffused daylight which creates more brightness in the corresponding room after it has passed through the covering element, but does not heat the room up in practice. The shading elements should prevent at least some of the rays of sunlight from passing through the transparent covering element and into the room. On the other hand, diffused daylight can still enter the room through the covering elements. Furthermore, there is a differentiation between completely blocking sunlight and shading it, i.e. between daylight-blocking elements and shading elements. The shading elements according to the invention prevent at least part of the sunlight from reaching the covering elements and thus entering into the room blow. In contrast to this, the daylight-blocking elements, such as those known from prior art DE 10 2010 031 714 A1, prevent both the sunlight and the diffused daylight from entering the room below, making the room darker.

This invention has the advantage that the shading element keeps at least part of the sunlight off of the covering element and the room underneath it. However, at the same time, daylight can pass through the transparent covering element and into the room so that it is sufficiently well lit. This is particularly important for adjacent rooms, e.g. for a living room or dining room that is situated next to a terrace covered by a slatted roof. By adjusting the angle of inclination of the slats in the slatted roof, the slats can be aligned in such a way that the shading elements keep the optimum amount of sunlight off, but can also allow heat to escape from inside the room to the outside.

According to the invention, it is proposed that one slat which is used in a slatted roof or window firstly has a flat covering element made from a light-permeable material, for example glass or plastic, and secondly has at least one shading element which protrudes from the covering element at a certain angle. The covering element is preferably constructed as a twin-wall sheet (multi-skin sheet). The shading element can be made from any material that is at least partially opaque. Preferably, the shading element should be made from a completely opaque material. Particularly preferable would be plastic or metal, particular aluminium.

It would also be conceivable for the slats, i.e. the covering and shading element, to be made from one single part, whereby in this case e.g. the covering element could be made from a light-permeable plastic, and the shading element could be made from a tinted or frosted plastic that is at least partially opaque.

It is also conceivable that the inventive slat could have several shading elements which are spaced apart from each other on the covering element. In this case, the individual shading elements of a slat can also be constructed differently, in particular the can be of different widths (or heights). The advantage of this is that the total height of a slat for any given shading rate (amount of shaded surface on the covering element in relation to the total surface of the covering element) can be kept lower. Different slats in a slatted roof or window can also, have differently designed shading elements.

In contrast to prior art, where the covering element (see DE 10 2010 031 714 A1) extends along the inside of the covering element and is mainly parallel to the areal extent of the covering element, in the inventive slat, the one or more shading elements extend at an angle to the areal extent of the covering element, preferably on the outside of the covering element. The first longitudinal side of the shading element is fixed to the covering element and the opposite longitudinal side sticks out from it at an angle. It is possible for the angle to be a fixed angle. However, it is also possible for the angle to be variable and e.g. adaptable depending on the current position of the sun or level of light.

The angle of the shading element is relative to the areal extent of the covering element, and the shape, dimensions and position of the shading element in relation to the covering element depend on individual requirements. Individual requirements can relate to the users wishes in terms of light and temperature. However, the individual requirements can also relate to the geographical location of the place that the slatted roof is being used and the highest position of the sun in this area. The higher the sun rises, the greater the selected width for the shading element should be in order to provide the desired amount of shade for the covering element.

The length of the shading element preferably corresponds primarily to the total length of the corresponding covering element, in order to at least partially shade the covering element over the whole longitudinal extent of the slat. In addition, in this manner, the stability of the covering element and its resistance against forces acting transversely across its areal extent (e.g. snow load) can be improved over the whole length of the slat.

The covering element and the one or more shading elements of a slat can be constructed as separate parts and be fixed to each other. This allows the shading element to be made from a different material to the covering element. E.g. it is possible to make a shading element from a metal, e.g. aluminium, and a covering element from a transparent plastic. The one or more shading elements can be fitted to the covering element in any way, particular by means of a Snap-On connection, plugging, clipping, sticking, soldering etc.

However, it is also possible that the one or more shading elements and the covering element can form one integrated part that is made in one single production step. E.g. by means of extrusion. Here, for the one or more shading elements, a different material to the covering element can also be used, e.g. a different type of plastic. However, it is also possible for both elements to be made from the same materiel but with different properties, e.g. for the one or more shading elements to be made from a plastic material that is tinted or that has sunlight-reflecting particles, in particular metal particles.

The shading element and the covering element preferable form one structural unit so that forces from the covering element can be directed into the shading element, diverted through it and dispersed. Here, the one or more shading elements and the covering element of a slat can be both separate parts or one integrated part. In this respect, the shading elements acts not only as a way to block at least part of the sunlight and thus shade at least part of the covering element, but it also acts as a means to reinforce and stabilise the slats in the transverse direction to the areal extent of the covering element. This means that the shading element can absorb forces from the covering element, which primarily act vertically down upon the areal extent of the covering element. These types of forces can be created e.g. by heavy precipitation, in particular heavy rain, hail or snowfall, but also by damp leaves or similar deposited on the upper side of the slatted roof. This means that a contingent small, light stabilizing frame can be made for the slat, possibly from a thin material, or a stabilizing frame can be omitted altogether.

The inventive slat can, for example, have a T-shaped cross-section. Here, the crossbar of the "T" can be formed by the covering element and the vertical bar of the T can be formed by the shading element if along the second longitudinal side of the shading element, with which it sticks out from the covering element, it has a reinforcement element that essentially runs vertically to the areal extent of the shading element, then the slat would have a cross-section in a shape resembling an "I."

In the example mentioned of a "T" or "I"-shaped cross-section of the slat, the shading element would be attached to the covering element at an angle of around 90° in relation to the areal extent of the covering element. However, this is not an essential prerequisite for this invention. On the contrary, the shading element can be positioned on the covering element at practically any angle relative to the areal extent of the covering element, in particular at an angle of 45° to 90°. Although, from a stability point of view, an angle of 90° between the shading element and the covering element is the most suitable. However, in contrast, for the task for which the shading element was primarily intended, which was to block at east part of the incoming sunlight and shade the covering element, it may make more sense not to have the shading element fixed at a 90° angle, but rather at any other angle which increases the shading effect upon the covering element.

It is possible for a shading element of this kind to be fixed to the covering element and for the first longitudinal side of the shading element to run more or less centrally between two parallel longitudinal sides of the covering element. The rotational axis of the slat, around which the slat can be pivoted between different positions (e.g. open or closed), should preferably run parallel to the longitudinal sides of the covering element. However, it is also possible for the rotational axis to run diagonally to the longitudinal sides or the covering element. Furthermore, it is also possible for the shading element of this type to be fixed to the covering element and for the first longitudinal side of the shading element to run along a longitudinal side of the covering element or in any other position.

It is also preferable when the shading element is fixed to the outer side of the covering element when the slat is fully closed, protruding upwards from it. Positioning the shading element on the outer side of the slat has the advantage that rays of sunlight, can be blocked before they reach the covering element and enter into the corresponding room. Overheating within the room in question, or even a build-up of heat in the room can therefore be effectively avoided, as the proportion of IR in the sunlight is not even able to penetrate the covering element and enter the room, but instead is absorbed or reflected or dispersed by the shading element. Furthermore, shading the covering element also avoids a glare effect.

However, it is also possible for the shading element to be fixed to the inside of the covering element. This is particularly advantageous when combined with a slat that can be pivoted around its rotational axis at an angle of more than 90°, preferably up to a second closed position at around 180°. With this, sunlight can be blocked during the summer by turning the shading element outwards, and in colder weather the shading element can be turned down (inwards) to allow rays of sunlight through the covering element and warm up the room below. At the same time, a glare effect is avoided and the load-bearing capacity of the slat is still ensured.

As discussed, the covering element can be constructed as a so-called twin-wall or multi-skin sheet. A sheet of this kind has at least two cover sheets that are spaced apart from each other in parallel to each other, between which there are, supports which run along the entire length of the slat, preferably vertically to the cover sheets. This creates a light, but very stable and resilient covering element. It is possible that for this, at least one of the supports or a shading element in that the material of the support is tinted or made opaque using light-deflecting or light-absorbing particles, in this way, the one or more supports can prevent at least part of the sunlight from reaching the lower cover sheet of the covering element. Cumulatively, several covering element supports constructed as shading elements would be able to shade the lower cover sheet.

This embodiment of the slat has the advantage that the one or more, shading elements are integrated into the covering element and therefore require very little installation space and very little room for the slat to pivot around its rotational axis.

Furthermore, it is possible to design the shading elements so that they are partially light-permeable, or to select the size, of the shading elements in such a way that the desired amount of sunlight passes through the shading elements or past them onto the covering elements, and then through these, into the room in question. This could be interesting e.g. countries and/or seasons where the sunlight is not very strong. In addition, the surface of the shading element can be specifically constructed so that at least part of the sunlight reaching it passes through the covering elements and into the corresponding room as diffused light, whereby the diffused light contains less heat energy because the majority of this is absorbed by the shading element.

By suitably arranging the surfaces of the shading element that are exposed to the sun, its optical reflective or absorption properties can be defined in the required way and adapted to suit individual requirements. The surfaces of the shading element can be flat. They can run parallel or diagonally to each other. The shading element can also have at least one curved surface, in particularly, a convexly curved surface. It is also possible for the surface to have light-diffusing elements, for example a microstructure with diffusion elements in the micrometer or nanometer range, prisms, cylinder lenses or similar. At least one surface of the shading element could also be facetted, whereby individual facets of the surface can be aligned at the specific angle inclination of the slat towards the sun.

The width (or height) of the shading element is preferably selected so that in the affected area where the shading slats are being used, practically the entire covering element is shaded in summer when the angle of the incoming sunlight is at its steepest. Depending on the number of shading elements, as well as their position and angle on the covering element, and depending on the relationship between the widths of each respective shading and covering element, it would be possible to rotate the slat around the rotational axis by more then 90° in at least one direction. If the width is small enough, the shading element can dip into the affected room from the outside inwards, past the neighboring slat. However, if the width of the slats shading element is large enough, the surface of this, in the area of the second longitudinal side protruding from the covering element, will come into contact with a neighboring covering element after a rotation of up to 90°, in particular with one of the longitudinal sides of the covering element. This can bring the slatted roof into a second type of closed position, in that the slatted roof is constructed similarly to e.g. a saw-tooth roof. If the shading element is in the corresponding position on the covering element (along one of its longitudinal sides), then the shading element can be put in a horizontal position by turning it by 90°, and this leads to a second closed position in which the second longitudinal side of the shading element lies upon its respective neighboring slat, in the second longitudinal position, the slatted roof or window is completely opaque.

The rotational axis can be located at any point on the slat, preferably on the shading element itself in the area of the covering element, because this is usually the part of the slat which has the greatest rigidity.

The slat is operated either manually or by means of a motor using the operating mechanism of the slatted roof or window. Suitable operating mechanisms and weather-sensitive controls are sufficiently known from prior art.

Figure 1:
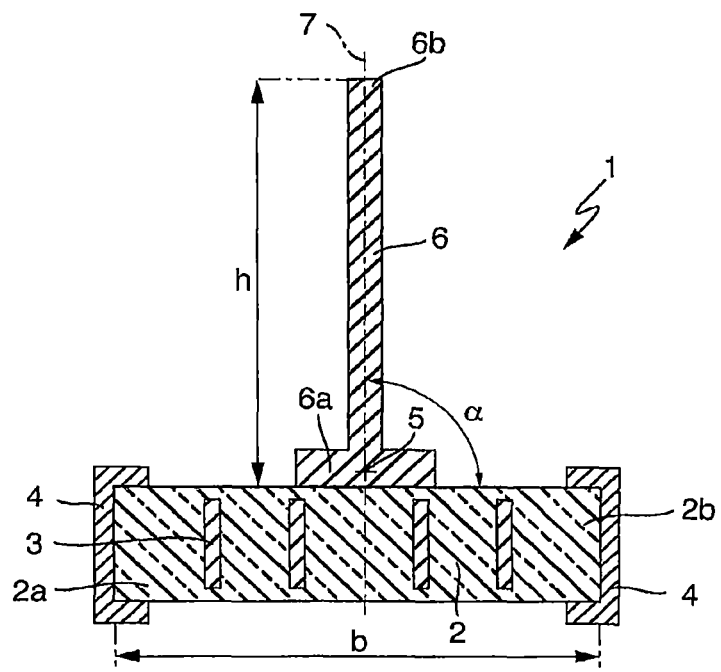
Figure 2:
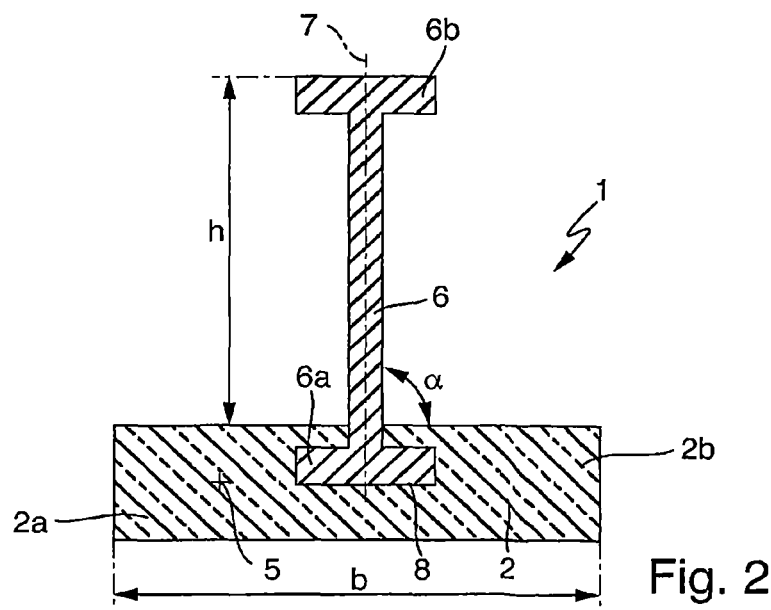
Figure 3:
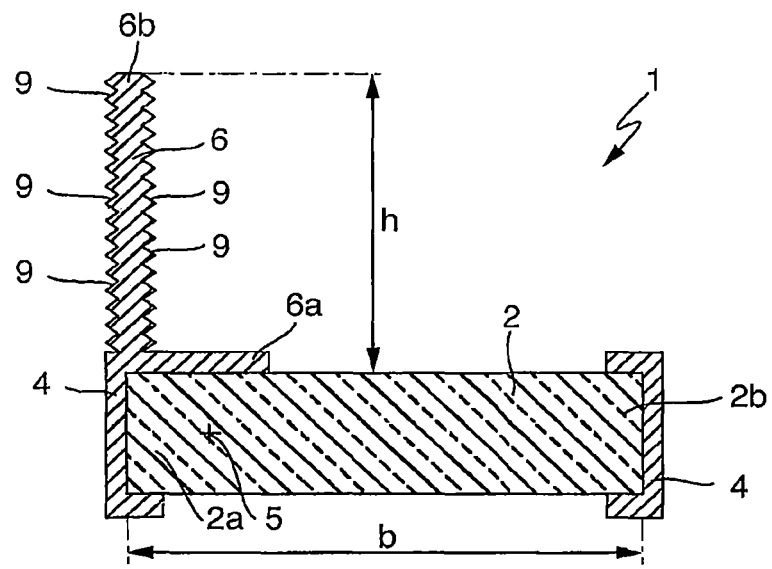
Figure 4:
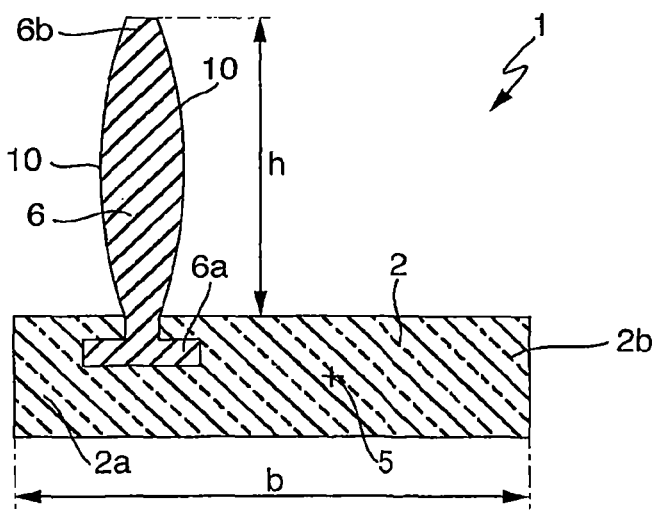
Figure 5:
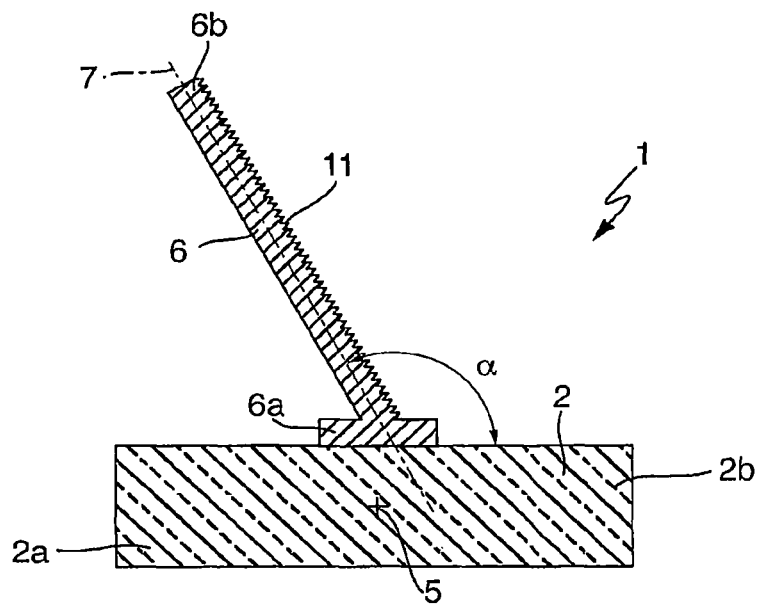
Figure 6:
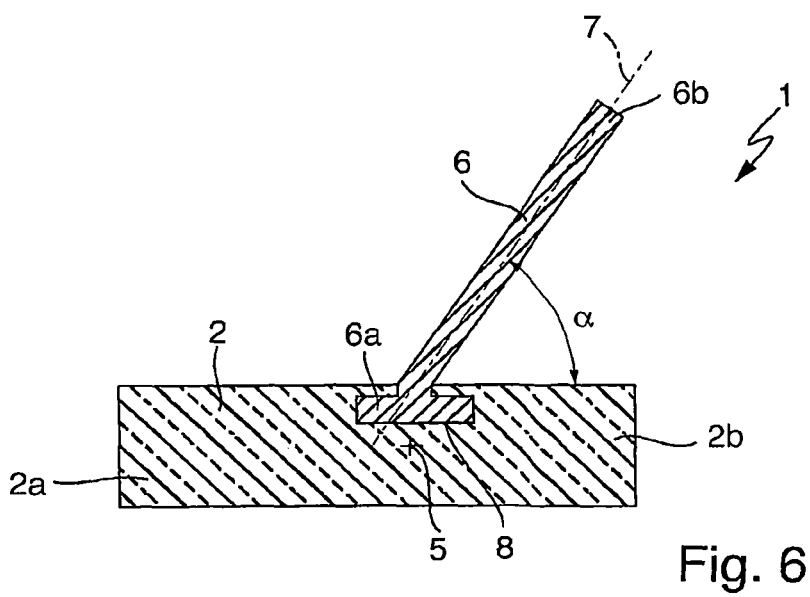
Figure 7:
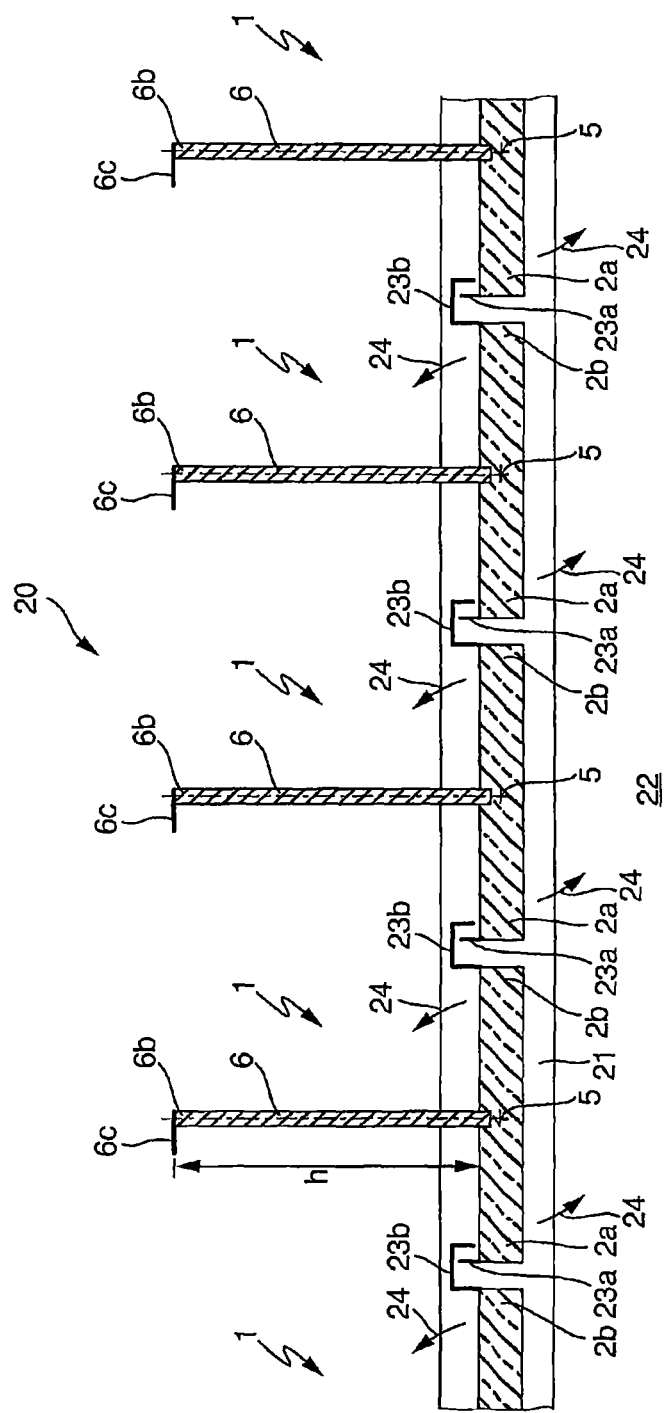
Figure 8:
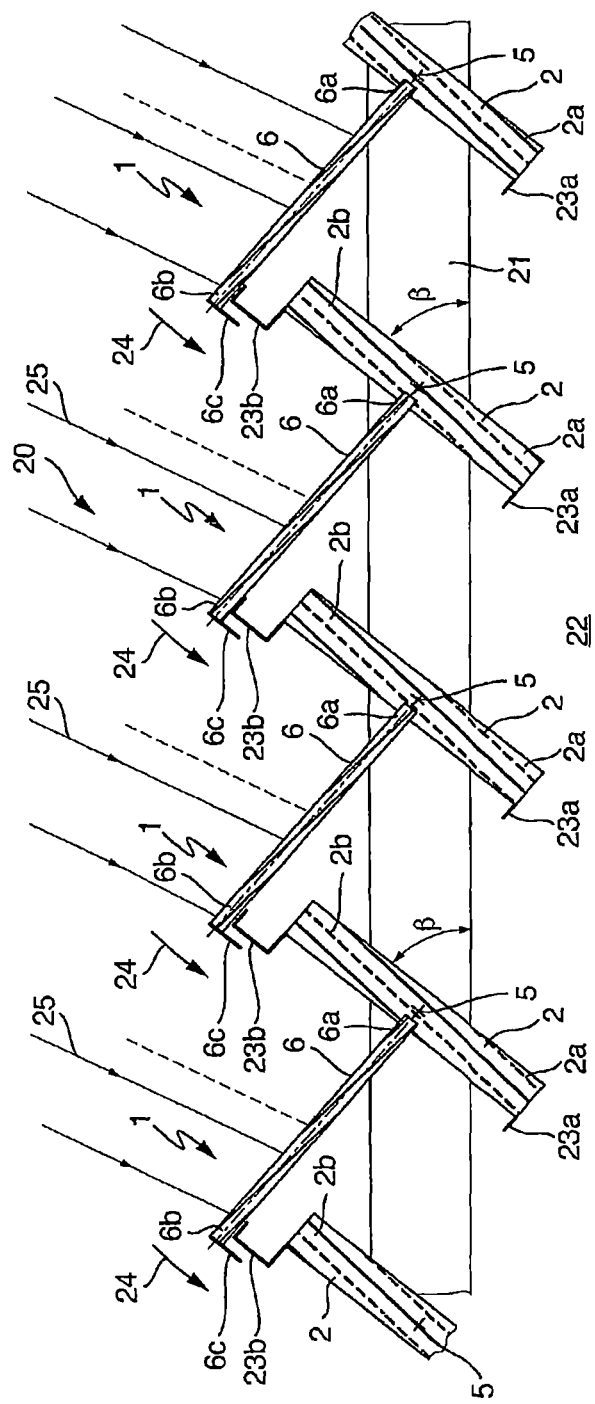
Figure 9:
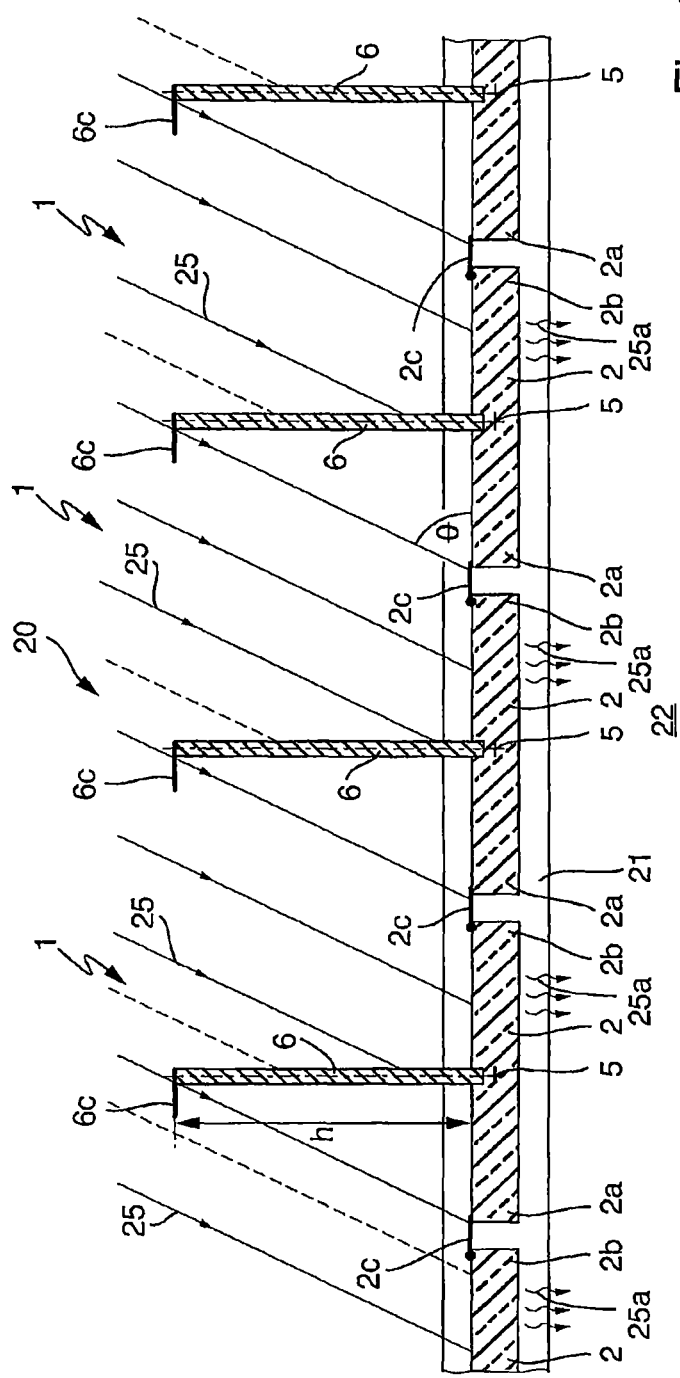
Figure 11:
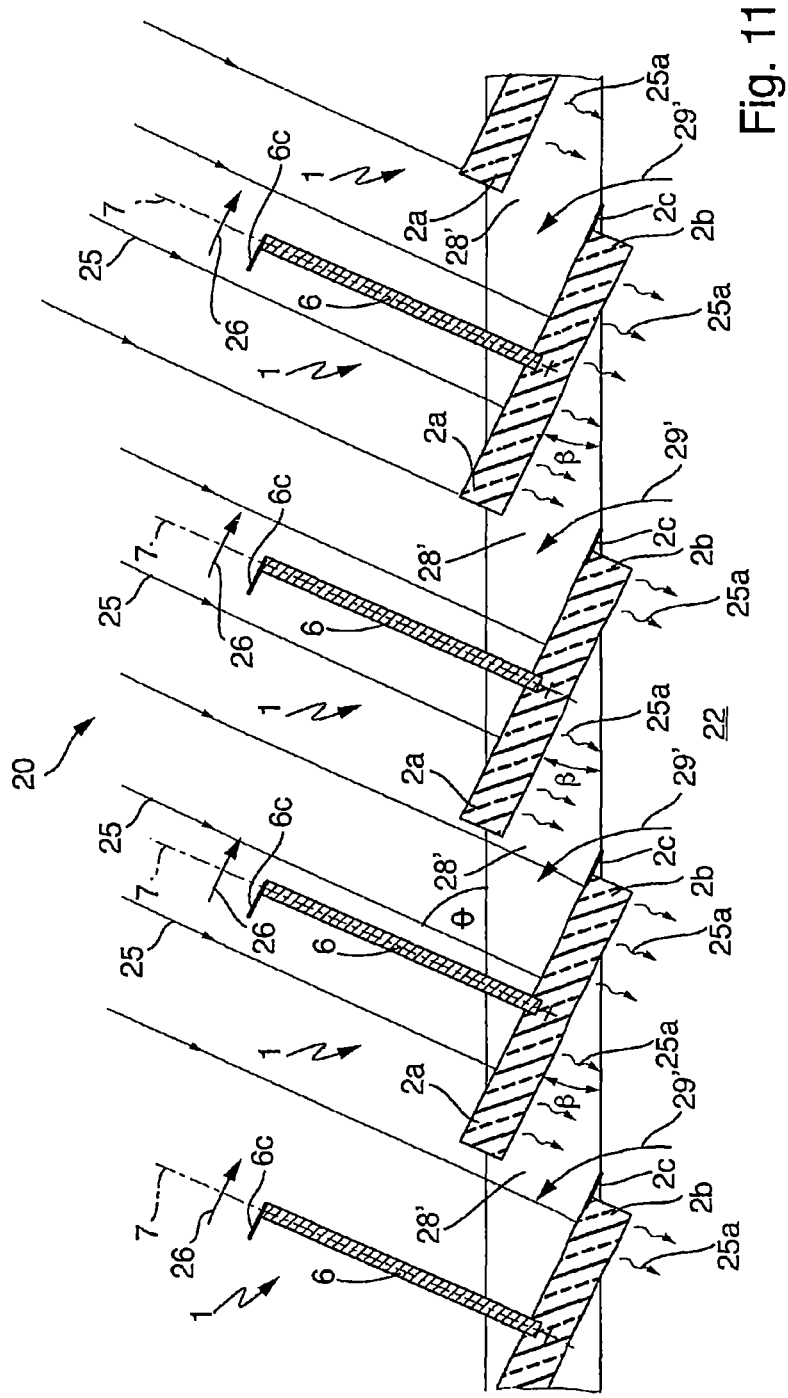
Figure 12:
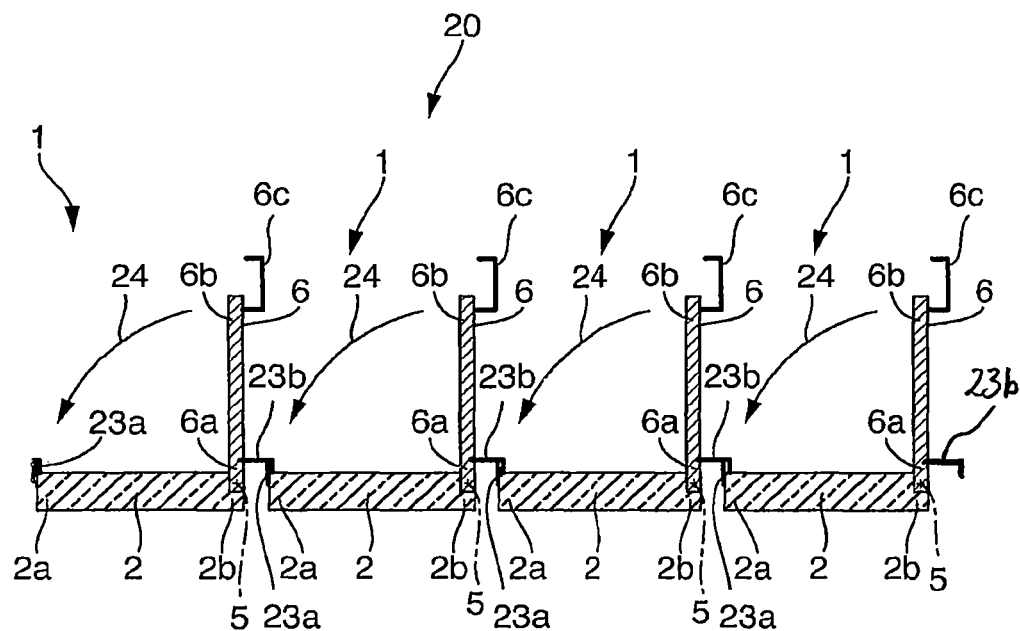
Figure 13:
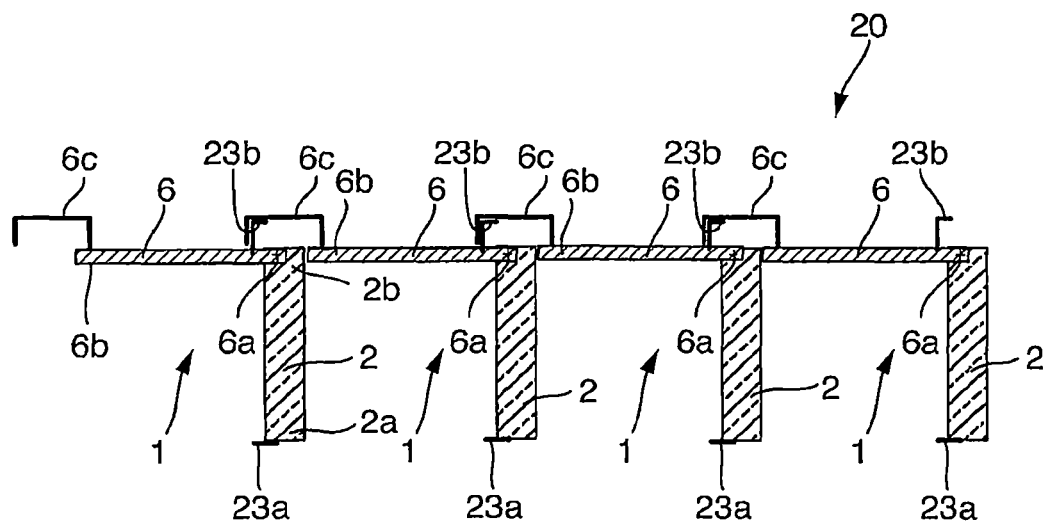
Figure 14:
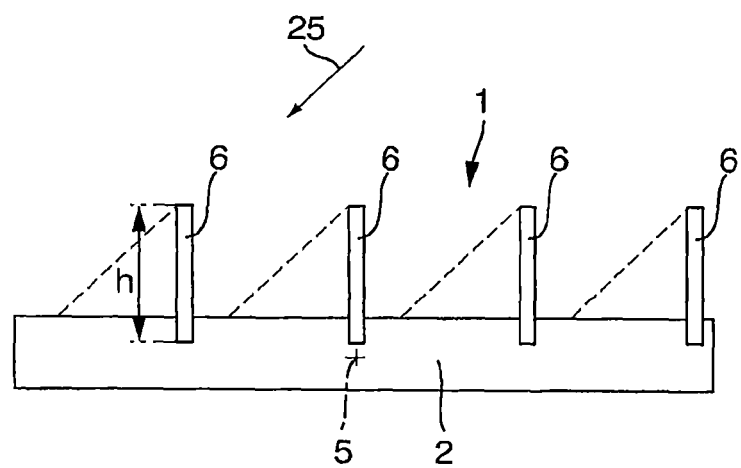
Figure 15:
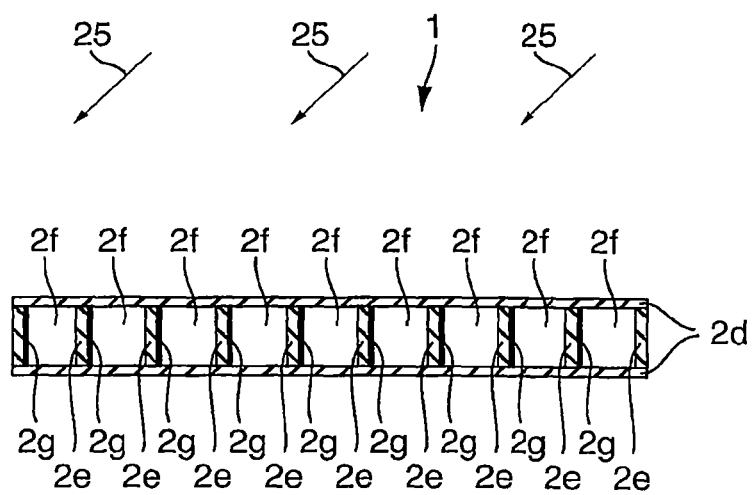
Figure 16:
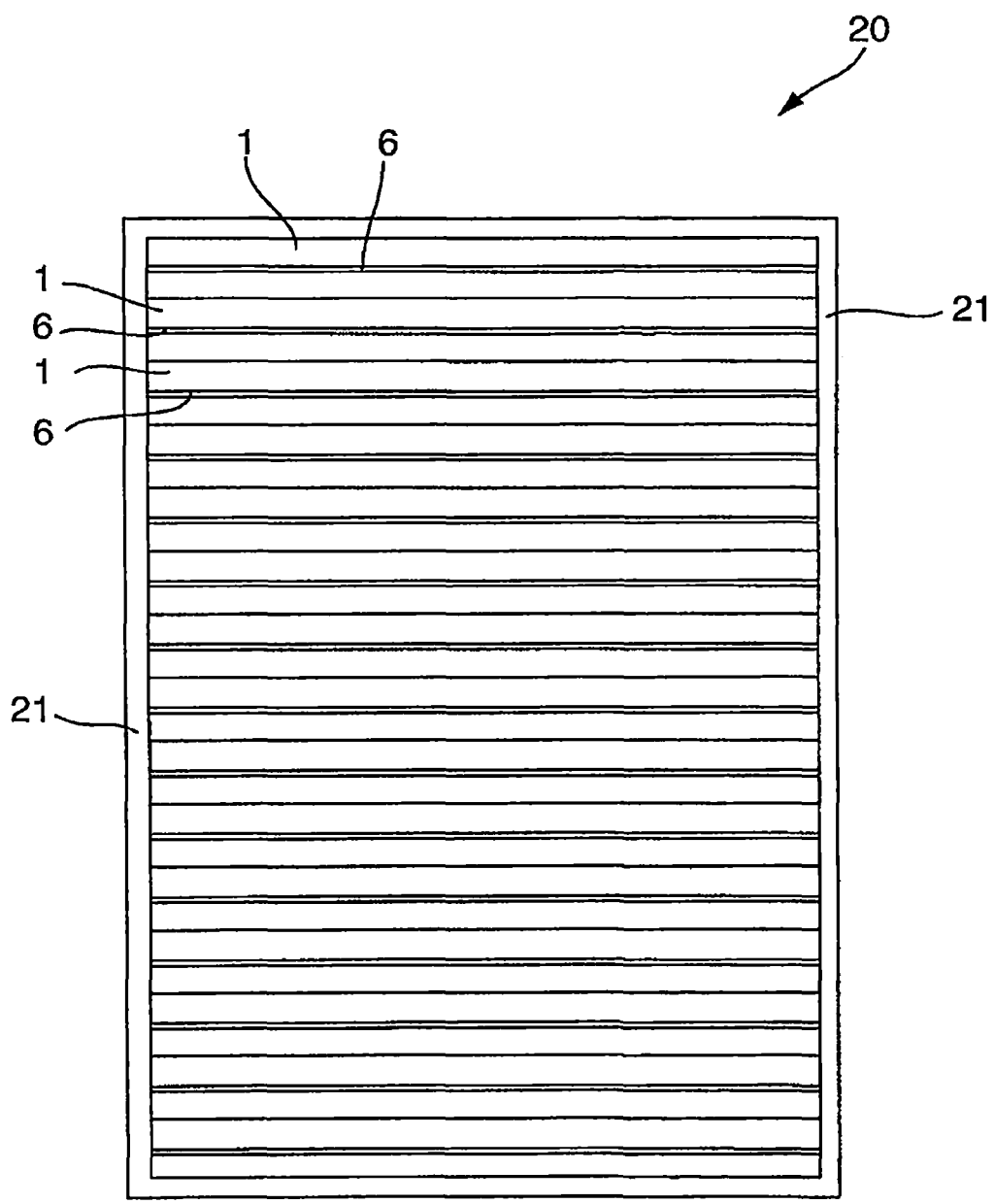
Figure 17:
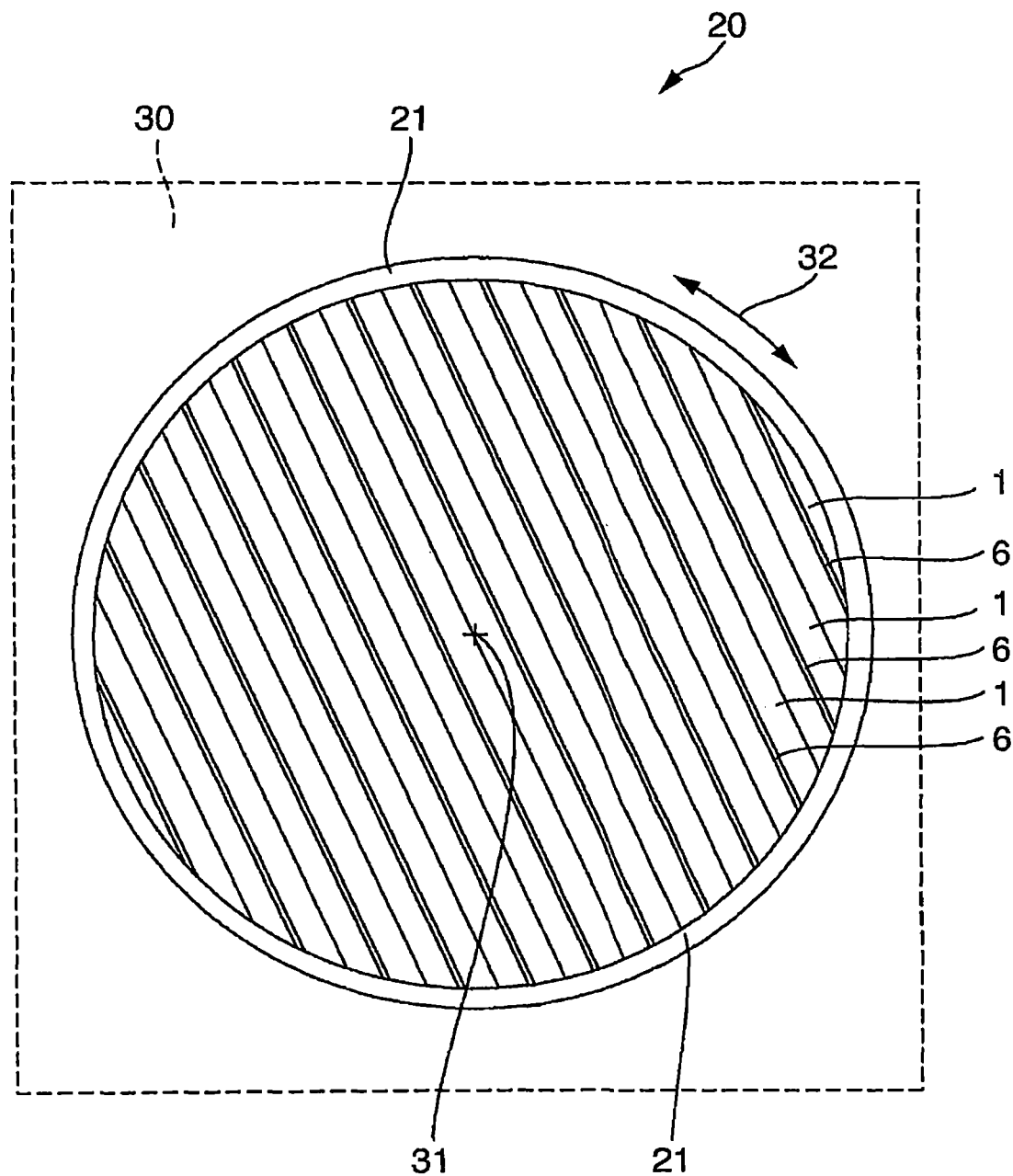

Other features and advantages of this invention are described below greater detail using figures which show the preferred embodiments of the invention. However, the invention is not limited to the embodiments that are illustrated. In fact, it is possible within the realms of this invention to pick out individual features from the different example embodiments and combine any of them with each other. The figures show:

FIG. 1 The cross-section of an inventive slat according to first preferred embodiment;

FIG. 2 The cross-section of en inventive slat according to second preferred embodiment;

FIG. 3 The cross-section of an inventive slat according to a third preferred embodiment;

FIG. 4 The cross-section of an inventive slat according to a fourth preferred embodiment;

FIG. 5 The cross-section of an inventive slat according to a fifth preferred embodiment;

FIG. 6 The cross-section of an inventive slat according to a sixth preferred embodiment;

FIG. 7 The cross-section of part of an inventive slatted roof with several slats according to a first preferred embodiment, with the slats in an initial position;

FIG. 8 The cross-section of the part of the inventive slatted roof from FIG. 7 with the slats in a second position;

FIG. 9 The cross-section of part of the inventive slatted roof with several slats according to a second embodiment with the slats in an initial position;

FIG. 10 The cross-section of the part of the inventive slatted roof from FIG. 9 with the slats in a second position;

FIG. 11 The cross-section of the part of the inventive slatted roof from FIG. 9 with the slats in a third position;

FIG. 12 The cross-section of part of the inventive slatted roof with several slats according to another preferred embodiment with the slats in an initial position;

FIG. 13 The cross-section of the part of the inventive slatted roof from FIG. 12 with the slats in a second position;

FIG. 14 The cross-section of en inventive slat according to another preferred embodiment:

FIG. 15 The cross-section of a slat according to another embodiment;

FIG. 16 An overhead view of an inventive slatted roof according to a first preferred embodiment; and FIG. 17 An overhead view of an inventive slatted roof according to a second preferred embodiment.

This invention relates to slats to be used in a slatted roof and/or in a slatted window. FIG. 1 depicts the cross section of a first preferred embodiment of an inventive slat, transverse to a longitudinal extent of the slat. The slat in its entirety is labeled with the reference number 1. The slat 1 comprises a covering element 2 with a more or less flat area extent. Of course, the covering element 2 can also have any other type of weal extent, e.g. a horizontal S-shaped cross-section, as is known from WO 2011/121370 A2. The covering element 2 is made from a transparent material, in particular glass or plastic. The covering element 2 should preferably be made from polycarbonate (PC) or poly methylmethacrylate (PMMA). The width of the covering element 2 is labeled with the letter b.

The covering element 2 has a longitudinal extent which is significantly greater than the width b. The covering element 2 can be permeated with stabilizing elements along the longitudinal extent to increase its stability, and these stabilizing elements are schematically marked in FIG. 1 and labeled with the reference number 3. The stabilizing elements 3 can be wires or rods or profiles made from a stable material, e.g. metal or plastic. Alternatively, or in addition, the covering element 2 can also be surrounded by a stabilizing frame 4, whereby in FIG. 1 only the longitudinal sides of the frame 4 that run along the longitudinal sides 2a, 2b of the covering element 2 are illustrated.

The slat 1 is can be pivoted around a rotational axis 5 which runs along the longitudinal extent of the covering element 2 in order to move it between different positions, e.g. a closed position and an open position. The rotational axis 5 preferably runs parallel to the longitudinal sides 2a, 2b of the covering element 2. The different positions that the inventive slat 1 can occupy are explained in fail detail below based on FIGS. 7 to 13.

The slat 1 also has a flat shading element 6 which is at least partially made from opaque material, in particular from metal or plastic, particularly preferably from aluminium. The shading element 6 is fixed to the covering element 2 and preferably extends with its longitudinal extent across the full length of the covering element 2, For the purposes of weight reduction, the shading element 6 can be constructed with thin walls, or, if it is made from a thick-walled material, it can have hollow spaces on the inside. The width of the shading element 6 is labeled with the letter h.

The shading element 6 ensures that the stability of the slat 1 is significantly improved along its longitudinal extent. Particularly forces that act on the covering element 2 from above can be absorbed and dispersed by the shading element 6, This effectively prevents the slat 1 from sagging or buckling around an axis running transverse to the longitudinal extent of the slat 1. In the example illustrated, the cross-section of the shading element 8 is shaped like a "T" or an inverted "T".

The first longitudinal side 6a of the shading element 6 is fixed to the covering element 2. In the example illustrated, the entire first longitudinal side 6a of the shading element 6 is stuck to the covering element 2. In order to increase the adhesive surface area between the shading element 6 and the covering element 2, the first longitudinal side 6a is broadened compared with the thickness of the wall of the rest of the shading element 8. Alternatively, the shading element 6 can also, for example, be fixed to the covering element 2 by means of laser welding. It would also be possible to make the covering element 2 and the shading element 6 as a joint component in one single production step, in the form of an integrated slot element.

One of the first longitudinal sides 6a of the shading element 6 protrudes from the covering element 2. This means that rays of sunlight which fall diagonally are at least partially blocked so they do not reach the covering element 2 and can therefore not enter the room below. This can prevent the room from overheating in a particularly effective way. The shading element 6 therefore ha a double function, namely shading at least part of the covering element 2 and increasing the stability of the slat 1.

Shading the covering element also helps to prevent an undesirable glare Effect. However, the room in question is still guaranteed to be well it, because diffused daylight can pass through the covering element unimpeded. The room is lit even further depending on the properties of the surface of the shading element by the fact that rays of sunlight which come into contact with the surface of the shading element facing the sun are reflected by it and then partially enter the room through the covering element as diffused light. The majority of the thermal energy is absorbed by the shading element so the diffused light does not heat up the room.

By fixing the shading element 6 to the covering element 2, forces which act on the covering element 2 are at least partially borne by the shading element 6 and dispersed from this over the length of the slat 1. Assuming that the surface of the covering element 2 to which the shading element 6 is fixed forms the outer side of the slat 1, when this is used in a slatted roof, a heavy load caused by debris (e.g. sand, soil, moss, leaves etc.) and/or precipitation (e.g. rain, hail, snow etc.) and/or wind can act on the slat 1 from the outside, which causes downward forces with force components acting vertically to the areal extent of the covering element 2. The shading element 6 can prevent the slat 1 from buckling along its longitudinal extent around an axis running roughly transversely to the longitudinal extent of the slat 1 under this load. This means that there is no need for the aforementioned stabilizing elements 3 and/or stabilizing frame 4 on the covering element 2 (see FIGS. 1 and 3), as shown in the embodiments in FIGS. 2 and 4 to 15.

It would of course also be possible for the surface of the covering element 2 to which the shading element 6 is fixed to be directed inwards, into the room. In this case, the shading element 6 would then be positioned on the inside of the slat 1 in its closed position. A shading element 6 positioned on the inside of the covering element 2 would also lead to the same improved stability of the slat 1 mentioned previously. An additional effect of the shading element 6 being placed on the inside would be that it "captures" the heat from the rays of sunlight that enter the room through the covering element 2, which can be a cost-effective and carbon-neutral way of heating the room in question using solar thermal energy, particularly in colder weather. The shading elements aligned pointing downwards also prevent a glare effect from the inside.

The areal extent of the shading element 6 is aligned at a given angle $\alpha$ to the areal extent of the covering element 2. In the example illustrated, the angle $\alpha=90°$. Here, the areal extent of the shading element 6 corresponding to section 7 runs essentially parallel to a surface normal (not shown) of the surface of the covering element 2 in the area of the adhesive point between the shading element 6 and the covering element 2. Of course, the angle $\alpha$ can be practically any angle, in particular it can be $10°<\alpha\leq170°$, particularly preferably $45°\leq\alpha\leq135°$.

FIG. 2 shows a second preferred embodiment of the inventive slat 1 in a cross-section transverse to a longitudinal extent of the slat 1. The slat 1 also comprises a covering element 2 made from a transparent material and a shading element 6 that is fixed to it and protrudes from it, made from a material that is at least partially opaque. The shading element 6 is fixed to the covering element 2 by inserting a longitudinal groove 8 into the surface of the covering element 2, which is constructed in such a shape and length that it receives the first longitudinal side 6a of the shading element 6. In particular, the shading element 6, or its first longitudinal side ea is inserted into the groove 8 along its longitudinal extent. This is done before the slat 1 is installed in a slatted roof construction. The first longitudinal side 6a of the shading element 6 can be kept in the groove 8 by means of friction locking or any other method (by means of positive locking or cured adhesive or silicone).

The first longitudinal side 6a can be kept in the groove 8 by means of a suitable sealant (not shown), e.g. in the form of transparent silicone lip seals on the inside or the upper edge of the groove 8 in order to prevent moisture from penetrating through. To improve the stability of the slat 1 against forces or force components acting essentially vertically against the areal extent of the covering element 2 (in this example embodiment, also parallel to section 7 of the shading element 6), the second longitudinal side 6b of the shading element 6 is constructed more broadly so the shading element 6 has a cross-section that is shaped like an "I."

The shading element 6 of the slats 1 from FIGS. 1 and 2 has a flat areal extent. In particular, the surfaces on the opposite sides of the shading element 6 are constructed parallel to each other. This can lead to the rays of sunlight which come into contact with the surfaces of the slats 1 shading element 6 facing the sun, and which are reflected by it, passing through the transparent covering element 2 of this slat 1 or a neighboring slat 1 into the room below, causing a glare effect. In order to avoid this, at least one of the surfaces of the shading element 6 facing the sun can therefore be constructed in a diffusing structure, which diffuses sunlight that comes into contact with it as wide as possible. The diffusing structure can e.g. be achieved by using a microstructure 11 (see FIG. 5), which has a variety of diffusing elements in a micro or nano range. Of course, the shading element 6 can also have a bent or curved areal extent.

FIG. 3 shows another example embodiment of an inventive slat 1 which both surfaces of the shading element 6 are facetted. Of course, it is also possible for just one of the surfaces to be fully partially facetted. In particular, the surfaces have a variety of facets 9 arranged on top of each other. By aligning the facets 9 in a targeted manner, the rays of sunlight can be reflected in any direction desired. This can be achieved e.g. by the shape of the facets 9 themselves, but also by turning the slat 1. In this way, the potential glare effect that could arise can be effectively lowered, or even completely prevented. In other example embodiments as well, facets 9 can be constructed at least on the surfaces of the shading element 6 that predominantly face the sun.

The example embodiment from FIG. 3 has another special feature, Here, the shading element 6 is not directly, but rather indirectly fixed to the covering element 2 via parts of the stabilizing frame 4 which surrounds the covering element 2 to improve stability. The corresponding part of the frame 4 and the shading element 6 can be constructed as an individual integrated component. Of course, this slat 1 design with a shading element 8 fitted to part of a stabilizing frame can also be applied to any other embodiments of the inventive slat 1, e.g. to the embodiments shown in FIGS. 1, 2, and 4 to 15.

Ultimately, the slat 1 from FIG. 3 differs from the slats 1 in FIGS. 1 and 2 in that the shading element 6 does not run centrally between the two Longitudinal sides 2a, 2b, but instead runs along a first longitudinal side 2a of the covering element 2. This would also be possible in the other embodiments of the inventive slats 1 according to FIGS. 1, 2 and 4 to 15.

In the example embodiments in FIGS. 1 to 3 and 5 to 15, the surfaces on opposite sides of the shading element 6 are constructed parallel to each other. However, it is of course also possible for the shading element 6 to have a curved surface. In this context, FIG. 4 shows a slat 1 in which its shading element 6 has two convexly curved surfaces 10 opposite each other. In this way, the light reflected by the surfaces 10 facing the sun is diffused more widely, in the other example embodiments in FIGS. 1 to 3 and 5 to 15, at least the surface of the shading element 6 that predominantly faces the sun could also be constructed as a curved surface 10.

In addition, with the slat 1 in FIG. 4, the rotational axis 5 of the slat 1 is positioned at a distance to the first longitudinal side 6a. However, it is also possible for the rotational axis to be positioned at any other point on the slat 1. This also applies to the example embodiments in FIGS. 1 to 3 and 5 to 15.

FIGS. 5 and 6 show other example embodiments of the inventive slat 1. They differ in particular in the value of the angle α at which the shading element 6 is positioned in relation to the covering element 2. In the example in FIG. 5, the angle α is >90° and is approximately 115°. On a surface of the shading element 6 that faces the sun, a diffusing structure is applied to it in the form of the aforementioned microstructure 11. In the example in FIG. 6, the angle α is <90 and is approximately 65°. Of course, the angle α can also be ≠90° in the other example embodiments in FIGS. 1 to 4 and 7 to 15.

FIG. 7 shows the cross-section of part of an inventive slatted roof 20 with several slats 1 according to a first preferred embodiment. The slats 1 are fitted to a supporting structure 21 of the slatted roof 20, e.g. in the form of a supporting frame, in such a way that they can be rotated round their rotational axis 5 and be switched between different positions. In FIG. 7, the slats are shown in a fully closed position. In order to se the room 22 below against heavy wind, debris and moisture from above whilst in this closed position, the covering elements 2 of the slats 1 have an interlocking, overlapping seal profile on their longitudinal sides 2a, 2b. These each comprise firstly of an initial, essentially flat sealing profile 23a which stands vertically upright on the first longitudinal side 2a of the covering element 2. The sealing profiles also each comprise a second, essentially "U"-shaped sealing profile 23b which opens downwards from the second longitudinal side 2b of the covering element 2. When the slat 1 is in its closed position, the first sealing profile 23a of the slat 1 interlocks with the opposite arms of the "U"-shaped sealing profile 23b of a neighboring slat 1 from below so that it seals. This, creates an overlap between the individual slats 1 in the closed position.

The sealing profiles 23a, 23b are preferably made from a rigid material, e.g. plastic or metal. It is particularly preferable for them to be made from plastic and form one single part with the covering element. However, in order to improve the sealing ability between the neighboring slats 1, each of which has a corresponding sealing profile 23a, 23b, the sealing profiles can also be made from a flexible, elastic material, e.g. rubber or a soft plastic, or alternatively have a suitable sealing material between the sealing profiles 23a, 23b in each of their respective interlocking areas. Of course, the seal between the slats 1 can also be achieved without the sealing profiles 23a, 23b in any other way. It is also possible for the sealing profile to be constructed differently to the version shown in FIG. 7 in order to ensure the slatted roof 20 is impermeable in its closed position.

The design of the sealing profiles 23a, 23b shown allows for the slats 1 to be rotated around their rotational axes 5 anti-clockwise (see arrow 24) in order to pivot the slats 1 from the closed position shown to a different position. The slats 1 can be operated manually or by a motor using a suitable operating mechanism, which will not be discussed in any detail here because these types of operating mechanisms are already sufficiently known from prior art. The pivoted position of the slats 1 can be an open position, or alternatively a second closed position as shown in FIG. 8. When the slats 1 are in their open position, the sealing profiles 23a, 23b separate from each other and create space between the slats 1 through which heat can escape from the room 22 below out into the surrounding environment. The ventilation holes formed by the space between the slats 1 have a longitudinal extent that runs parallel to longitudinal extent of the slats 1. Two examples of different open positions of the slats 1 are shown in FIGS. 10 and 11 and are described in greater detail below.

When moving the slats 1 of the slatted roof 20 in FIG. 7 around the rotational axes 5 in the direction of the arrow 24, the slats 1 initially go into an open position. When the slats 1 are then moved further in the direction of the arrow 24, after rotating the slats 1 by a certain angle β, the second longitudinal sides 6b of the shading elements come into contact with the second longitudinal sides 2b of their respective neighboring covering element 2, as shown in FIG. 8, in particular, a surface of the shading element in the area of the second longitudinal side 6b comes into contact with the side of the second "U"-shaped sealing profile 23b. This brings the slats 1 into a second closed position in which the slatted roof 20 is once again closed. In the example illustrated, the angle of rotation β is approximately 50°. Of course, the second closed position of the slats 1 can also be achieved with a different angle of rotation depending on the position of the shading element 6 on the covering element 2, e.g. 30°≤β≤80°.

When a suitable sealant is used between the sealing profiles 23b of the slats 1 and the second longitudinal sides 6b of the shading elements 6, the slatted roof 20 can also keep out wind and moisture in its second closed position. This sealing ability is preferably achieved using an overlapping element 6c which runs along the second longitudinal side 6b. In the second closed position, a slatted roof 20 takes a form similar to that of a saw-toothed roof. Daylight can enter the room 22 through the covering elements 2 whilst the shading elements 6 block at least some of the rays of sunlight with their surfaces facing the sun. This slat 1 position allows the room 22 to be lit with daylight whilst at the same time preventing the indoor space 22 from heating up.

Based on FIG. 8 it is clear that the individual slats 1 could be rotated around the rotational axes 5 by more than the given angle β if the shading elements 6 were smaller in width h (see FIG. 7). Then the slats 1 could theoretically be rotated around the rotational axes 5 by up to 360°.

In practice, a possible rotation of 180° would already bring significant advantages. By rotating the slats 1 around the rotational axes 5 by an angle β≤90°, the shading elements 6 positioned on the outside of the slatted roof 20 slats 1 would shade the covering elements 2 increasingly effectively, whilst also ventilating the room. During the colder months, the slats could then be rotated around the rotational axes 5 by an angle 90° so the shading elements 6 point downwards into the room 22. When reaching an angle β of approx. 180°, the covering elements would come into contact with each other again, resulting in a new closed position. In this way, the slats 1 ensure that the light coming into the room 22 through the covering elements 2 is "captured," thus ensuring that the room 22 heats up, because in this position, no heat can escape upwards. The advantageous, significant stability of the slats 1 would also remain with shading elements 6 pointing inwards, in addition, in this case, the shading elements 6 would also reduce or completely prevent the glare effect from the inside.

FIG. 9 shows a cross-section of part of an inventive slatted roof 20 with several slats 1 according to another preferred embodiment. The slats 1 are fixed to a supporting structure 21 of the slatted roof 20 in such a way that they can rotate around their rotational axes 5 and move between different positions. FIG. 9 shows the slats in a completely closed position.

In contrast to the previous example embodiments, the sealant here, which works in between the longitudinal sides 2a, 2b of the covering elements 2 of the neighboring slats 1, is particularly simply constructed and comprises at least one lip seal 2c each made from flexible, elastic material, e.g. rubber or soft plastic, with a primarily flat horizontal areal extent, whereby a lip seal 2c runs along each of the first longitudinal sides 2a and/or the second longitudinal sides 2b of the covering elements 2. In the example shown, only one lip seal 2c is positioned on each of the second longitudinal sides 2b of the covering elements 2. The lip seals 2c is on the upper side of the covering elements 2 of the neighboring slats 1 in the area of the first longitudinal sides 2a when the slats 1 are in their closed position. With this sealant design, the slats 1 can not only be pivoted around the rotational axes anticlockwise 24, but also clockwise 26. This creates an even greater degree of freedom with regards to the possible positions of the slats 1 and the variations in temperature, climate and lighting conditions within the room 22.

In FIG. 9, rays of sunlight are schematically plotted and labeled with the reference number 25. The rays of sunlight 25 are coming in with the sun at an angle $\theta$ of approximately 65°, which is roughly equivalent to the highest possible point of the sun in Europe during the summer solstice. In the example shown, part of the surface of each of the transparent covering elements 2 is shaded by its corresponding shading element 6 of that slat 1 or a neighboring slat 1. Only part of the sunlight, labeled with the reference number 25a, passes through the unshaded part of the transparent covering elements 2. By increasing the width h of the shading elements 6 or by rotating the slats 1 larger, parts of the covering elements 2 can also be shaded so that the internal room 22 heats up as little as possible or not at all.

FIG. 10 shows the slatted roof 20 from FIG. 9, whereby the slats 1 are in a position in which the covering elements 2 are completely shaded by the shading elements 6. Here, the slats 1 are pivoted anti-clockwise 24 by an angle $\beta$ so that the areal extent section 7 of the shading elements 6 essentially runs vertically to the rays of sunlight 25. In particular, the angle $\beta$ of rotation of the slats 1 is essentially the same as the angle of the sun $\theta$. In this position, the shading elements 6 block all of the rays of sunlight 25 from reaching the transparent covering elements 2, so no rays of sunlight 25 come into contact with the covering elements 2. Between the first longitudinal sides 2b of the covering elements 2 and the second longitudinal sides 6b of the shading elements 6 of the neighboring slats 1, ventilation slits 28 are formed due to the slanted position of the slats 1, through which warm air 29 from the internal room 22 can escape upwards into the surrounding environment.

If the tilted angle $\beta$ of the slats 1 is increased a little further from the position of the slats 1 in FIG. 10, until the second longitudinal sides 6b the shading elements 6 lie on top of the second longitudinal sides 2b of the covering elements 2 of the neighboring slats 1, this creates a configuration that corresponds to the saw-toothed roof configuration in FIG. 8. The lip seals 2c fitted to the second longitudinal sides 2b of the covering elements 2 can also act as a sealant between the second longitudinal sides 6b the shading elements 2 and the second longitudinal sides 2b of the covering elements 2 of the neighboring slats 1 in the saw-toothed configuration. Here, too, an overlapping element 6c can be positioned along the second longitudinal side 6b of the shading elements 6b.

FIG. 11 shows the slatted roof 20 from FIG. 9, whereby the slats 1 are in a position in which the largest possible amount of sun 25a can pass through the transparent covering elements 2 of the slats 1 and into the internal room 22. This position makes sense if the maximum light intensity is desired whilst still having ventilation. The shading elements 6 have hardly any shading effect. The slats 1 are each pivoted by an angle of $\beta=90°\text{-}\theta$ from the position shown in FIG. 9, so in this example by $\beta=25°$ clockwise 26. The longitudinal extent or extent section 7 of the shading elements 6 runs essentially parallel to the rays of sunlight 25. Between the longitudinal sides 2a, 2b of the neighboring slats 1 ventilation slits 28' are formed due to the slanted position of the slats 1, through which warm air 29' can escape from the indoor room 22 upwards into the surrounding environment.

Part of a particular version of the inventive slatted roof 20 is shown in FIG. 12 in an initial closed position. As an example, four slats 1 of the slatted roof 20 are shown here. The slats 1 each comprise a transparent covering element 2 and a shading element 6 that runs along the full longitudinal extent of a longitudinal side 2b of the covering element 2, and the shading element protrudes outwards from the covering element 2 at a right angle. A sealing profile 23a in the form of a lip seal is attached to the first longitudinal side 2a of the covering element 2 of a slat 1, and in the first closed position this lip seal works in conjunction with a corresponding sealing profile 23b that is opened downwards, which is positioned on the first longitudinal side 6a of the shading element 6 of a neighboring slat 1. In this way, the slatted roof 20 is sealed in the first closed position. This forms a mostly transparent slatted roof 20, whereby the covering elements 2 are at least partially shaded by the shading elements 6 to prevent the internal room 22 from overheating.

The width (or height) of the shading element 6 of a slat 1 is chosen in such a way that it roughly the same width as the covering element 2 of the corresponding slat. By pivoting the slats 1 anti-clockwise 4 by approximately 90°. The shading element 6 reaches a horizontal position, as shown in FIG. 13. The sealing profiles 6c on the second longitudinal sides 6b of the shading elements 6 then seal the slats by gripping the first longitudinal sides 6a of the shading elements 6 or the second longitudinal sides 2b of the covering elements 2 of the neighboring slats 1. This means that the sealing profiles 6c can overlap the open sealing profiles 23b. FIG. 13 therefore shows the slatted roof 20 in a second closed position, in which the room 22 underneath is completely shaded by the shading elements 6.

FIG. 14 shows a particular version of a slat 1 for a slatted roof 20. The slat 1 has several—in the example shown, 4—shading elements 6 which are spaced apart from each other and positioned on the covering element 2. This has the advantage that the total height of a slat 1 for any given shading rate (shaded area of the covering element 2 in relation to the total surface area of the covering element 2) can be kept lower. This means that rotating the slat 1 around the rotational axis 5 by more than 90° is easier and more practical. In this case, the individual shading elements 6 of a slat 1 can also each be designed differently; in particular, they can have different widths h (or heights). Different slats 1 in the slatted roof 20 or slatted window can also have shading elements 6 that are each designed differently.

Another possibility arises when the covering element 2 is constructed as a so-called twin-wall or multi-skin sheet, in particular a double-skin sheet, as shown by way of example in FIG. 15. This type of sheet has two cover sheets 2d positioned at a distance from each other and parallel to each other, and between them there are supports 2e running along the whole length of the slat 1, preferably positioned vertically in relation to the cover sheets 2d, These form a hollow chamber on the inside of the covering element 2.

Here it would be possible for the shading elements 6 to not be positioned on the outside of the covering elements 2, but rather be integrated into it. To achieve this, at least one of the supports 2e can form a shading element 6 by making the support 2e material tinted or opaque, or by adding light-diffusing or light-absorbing particles to it. In this way, the one or more supports 2e can at least partially prevent the incoming sunlight 25 from coming into contact with the lower or inner cover sheet 2d of the covering element 2. Cumulatively, several covering element 2 support s 2e constructed as shading elements 6 would be able to shade the lower cover sheet. In this case, the covering element 2 could be made by means of a co-extrusion process, whereby the cover sheets 2d and the supports 2e can be made from different materials or have different properties. It would also be possible for the supports 2e terming a shading element 6 to be given an opaque, light-diffusing or light-absorbing coating 2g after production.

It is also possible for the slate 1 to be controlled and operated automatically depending on current weather conditions in the environment surrounding the slatted roof 20, the position of the sun θ, the intensity of the sunlight, the current precipitation conditions or other similar issues, or depending on the internal temperature of the room 22 in question. Here, the automatic controls can be a component in the temperature and/or light intensity regulation for the room 22. The desired indoor temperature and/or light intensity can be set by the user and acts as a target value for the controls. When the temperature and/or light intensity in the room becomes too high, then the slats 1 will be moved closer towards a position in which the shading elements 6 block more light (see e.g. FIGS. 8, 10 and 13). When the indoor temperature and/or light intensity becomes too low, i.e. goes below the target value by a certain amount, then the slats can be moved closer towards a position in which the shading elements $ block less sunlight 25 (see e.g. FIG. 11).

The regulator can be overridden by a control which closes the roof 20 regardless of the indoor temperature and light intensity (see e.g. FIGS. 7 to 9, 12 and 13), if the weather conditions require it, e.g. if the wind becomes too strong or there is precipitation. Furthermore, the regulator can be overridden by another control which puts the slats 1 into a sump r position (see FIGS. 7 to 13) during the warmer months, in which the shading elements 6 are positioned on the outside of the slatted roof 20 and therefore essentially protrude outwards, and in the colder months puts them into a winter position, in which the shading elements 6 essentially point downwards into the room 22. Of course, this type of control is only possible if the width h of the shading elements 8 is selected so that it is small enough to make it possible for the slats 1 to rotate by more than +/−90° from their closed position.

FIG. 16 shows an overhead view of a slatted roof 20 according to a first preferred embodiment of the invention. The stets 1 are in a summer position, i.e. the shading elements 6 are pointing upwards into the surrounding environment, and the slats 1 are fully closed. The slats are fixed onto a rectangular supporting frame 21 in such a way that they can rotate around their rotational axes which run along the longitudinal extent of the slats 1. The supporting frame 21 is preferably static, e.g. fixed to the ground using poles. Completely transparent or partially transparent and/or completely opaque wall elements can be positioned in between the poles and between the supporting frame 21 and the ground, so that when the slatted roof 20 is closed, the room 22 is completely sealed off from the outside.

With this type of slatted roof 40, in order to provide the optimum amount of shade, the slats 1 are aligned in such a way that the longitudinal extent of each of the slats 1 run transversely to the rays of sunlight at a certain time of day, it is preferable to select midday as the selected, time of day, as this is the time when the angle of the sun θ and the intensity of the sunlight are at their highest. Alternatively, it is also possible for the slats 1 to be aligned in such a way that the longitudinal extent of the slats 1 run at an angle of up to +/−45° in relation to the sunlight at a certain time of day, preferably at midday.

FIG. 17 shows an overhead view of another example embodiment of the inventive slatted roof 20. Here, the supporting structure 21 of the slatted roof 20 is a circular ring shape, and the slats 1 of different lengths are fixed to this in such a way that they can be rotated around their horizontal rotational axes. The length of the slats 1 is selected in such a way that they preferably cover the entire circular ring surface enclosed by the supporting structure in their closed position, whilst at the same time can still be pivoted between the different positions around their horizontal rotational axes, without the covering elements 2 and/or the shading elements 6 of the slats 1 colliding with the supporting structure 21.

The supporting structure 21 is fitted within an external housing structure 30 in such a way that it can be rotated around a vertical rotational axis 31. The rotating motion around the axis 31 is symbolised by an arrow 32. The housing structure 30 is e.g. part of a flat roof or similar. It can also be constructed in any other quadratic shape different to that shown in FIG. 17, in particular a circular shape that is concentric to the rotational axis 31. With the supporting structure 21 being fitted in such a way that it can rotate around the rotational axis 31 it is possible to adjust the alignment of the slats 1 to adapt to the current position of the sun, so the slats 1 are always aligned in such away that the longitudinal extent of each slat 1 runs at a given angle to the rays of sunlight at a certain time of day. To provide the optimum amount of shade for the covering elements 2, the given angle should be approx. 90°. However, they can of course also be set at any other angle. This means that the longitudinal extent of the slats 1 runs in a roughly north-to-south direction in the morning and in the evening, so that optimum shading can be provided whether the sun is rising in the east or setting in the west. Between the morning and the evening, the supporting structure 21 rotates around the rotational axis 31 by approx. 180° so that the longitudinal extent of the slats 1 run in an east west direction, e.g. at midday, meaning that the optimum amount of shade can be provided for a high midday sun in the south (in the northern hemisphere) or in the north (in the southern hemisphere). The rotation of the supporting structure 21, together with the slats 1, around the rotational axis 31 should preferably be carried out automatically by means of a motor, depending on the location of the slatted roof 20 (northern or southern hemisphere as well as the geographical longitude), the time of year (direction of sunrise and sunset), the current weather conditions (wind, precipitation etc) and/or the time of day (time for the current position of the sun). The rotating motion 32 of the supporting structure 21 should preferably be continuous or virtually continuous in such small steps that it is barely noticeable to people in the room below.

The invention claimed is:

1. A slatted roof (20) with a supporting structure (21) and slats (1) arranged parallel to each other, which are fitted to the supporting structure (21) in such a way that they can each be rotated around a respective rotational axis (5) which runs along their longitudinal extent in order to pivot the slats (1) between a closed position and an open position, wherein the slats (1) each have a transparent, flat covering element (2) with a longitudinal extent, two longitudinal sides (2a, 2b) running along the longitudinal extent, and a width (b), the width (b) being shorter than the longitudinal extent, and each slat (1) also having at least one partially opaque, flat shading element (6) with a corresponding longitudinal extent and a corresponding height (h), the corresponding longitudinal extent of which extends along at least part of the length of the longitudinal extent of the transparent, flat covering element (2), and which is fixed to the transparent, flat covering element (2) with a first longitudinal side (6a), and a second longitudinal side (6b) of the at least one partially opaque, flat shading element (6) opposite the first longitudinal side (6a) protrudes from the transparent, flat covering element (2), wherein the at least one partially opaque, flat shading element (6) is positioned in its areal extent at an angle (α) with respect to a corresponding areal extent of the transparent, flat covering element (2), wherein the transparent, flat covering elements (2) of the slats (1) have a sealant (23a; 23b; 2c) on at least one of their first and second longitudinal sides (2a, 2b), wherein the position of the partially opaque, flat shading elements (6) on transparent, flat covering elements (2), and the corresponding height (h) of the partially opaque, flat shading elements (6), and the width (b) of the transparent, flat covering elements (2), are coordinated in such a way that the slats (1), from a first closed position, in which a sealing effect is achieved between corresponding first longitudinal sides (2a) of the transparent, flat covering elements (2) of the slats (1) and corresponding second longitudinal sides (2b) of the transparent, flat covering elements (2) of their respective neighboring slats (1), and the partially opaque, flat shading elements (6) are fixed to an outer side of the transparent, flat covering elements (2) and protrude upwards from them, can be rotated around their rotational axes (5) into a second closed position in which a corresponding sealing effect is achieved between the corresponding second longitudinal sides (6b) of the partially opaque, flat shading elements (6) of the slats (1) and corresponding second longitudinal sides (2b) of the transparent, flat covering elements (2) of their respective neighboring slats (1).

2. A slatted roof (20) according to claim 1, characterized in that the slats (1) can also be moved around their rotational axes (5) into at least a first open position in which the corresponding second longitudinal sides (6b) of the partially opaque, flat shading elements (6) of the slats (1) are positioned at a distance from the corresponding second longitudinal sides (2b) of the transparent, flat covering elements (2) of their respective neighboring slats (1), and the distance forms a first ventilation gap (28).

3. A slatted roof (20) according to claim 1, characterized in that the slats (1) can also be moved around their rotational axes (5) into at least a second open position in which the first longitudinal sides (2a) of the transparent, flat covering elements (2) of the slats (1) are positioned at a distance from the corresponding second longitudinal sides (2b) of the transparent, flat covering elements (2) of their respective neighboring slats (1), and the distance forms a second ventilation gap (28').

4. A slatted roof (20) according to claim 1, characterized in that the sealant (23a; 23b; 2c) on at least one of their first and second longitudinal sides (2a, 2b) creates an imperviousness of the slatted roof (20) in the first closed position.

5. A slatted roof (20) according to claim 4, characterized in that the sealants (23a; 23b; 2c) are constructed as interlocking, mutually overlapping sealing profiles (23a, 23b), whereby a first sealing profile (23a) is positioned on the corresponding first longitudinal sides (2a) of the transparent, flat covering elements (2) of the slats (1), and a second sealing profile (23b) is positioned on the corresponding second longitudinal sides (2b) of the transparent, flat covering elements (2), and first and second sealing profiles (23a, 23b) of neighboring slats (1) interlock with each other in the first closed position, making the roof (20) impermeable.

6. A slatted roof (20) according to claim 4, characterized in that the sealants (23a; 23b; 2c) are constructed as lip seals (2c), whereby the lip seals (2c) are positioned on the corresponding first and/or second longitudinal sides (2a, 2b) of the transparent, flat covering elements (2) of the slats (1), and in the first closed position the lip seals (2c) of the transparent, flat covering elements (2) of the slats (1) rest on the corresponding first or second longitudinal sides (2a, 2b) facing the lip seals (2c), or on the lip seals (2c) of transparent, flat covering elements (2) of neighboring slats (1), making the roof (20) impermeable.

7. A slatted roof (20) according to claim 5, characterized in that the interlocking, mutually overlapping sealing profiles (23a, 23b) are made from metal or plastic.

8. A slatted roof (20) according to claim 1, characterized in that the sealant (23a, 23b, 2c) is made from an elastic material, including rubber or plastic.

9. A slatted roof (20) according to claim 1, characterized in that the longitudinal extent of each of the partially opaque, flat shading elements (6) extends the full length of the corresponding longitudinal extent of the transparent, flat covering element (2) on which it is fixed.

10. A slatted roof (20) according to claim 1, characterized in that the partially opaque, flat shading elements (6) are constructed in such a way that they act as reinforcement of the transparent, flat covering elements (2) onto which they are fixed, each in a direction transverse to the corresponding areal extent of the transparent, flat covering element (2).

11. A slatted roof (20) according to claim 1, characterized in that the partially opaque, flat shading elements (6) are each fixed to a respective transparent, flat covering element (2) in such a way that the first longitudinal side (6a) of a respective partially opaque, flat shading element (6) runs centrally between two parallel longitudinal sides (2a, 2b) of the respective transparent, flat covering element (2) onto which the respective partially opaque, flat shading element (6) is fixed.

12. A slatted roof (20) according to claim 1, characterized in that the partially opaque, flat shading elements (6) are each fitted to a respective transparent, flat covering element (2) in such a way that the first longitudinal side (6a) of a respective partially opaque, flat shading element (6) runs along a respective longitudinal side (2a; 2b) of the respective transparent, flat covering element (2) onto which the respective partially opaque, flat shading element (6) is fixed.

13. A slatted roof (20) according to claim 1, characterized in that the supporting structure (21) of the slatted roof (20) is constructed in a circular shape and can be rotated as a whole around an axis (31) that runs substantially vertically to the rotational axes (5) of the slats (1), through the center of the circle.

14. A slatted roof (20) according to claim 2, characterized in that the slats (1) can also be moved around their rotational axes (5) into at least a second open position in which the corresponding first longitudinal sides (2a) of the transparent, flat covering elements (2) of the slats (1) are positioned at a distance from the corresponding second longitudinal sides (2b) of the transparent, flat covering elements (2) of their respective neighboring slats (1), and the distance forms a second ventilation gap (28').

15. A slatted roof (20) with a supporting structure (21) and slats (1) arranged parallel to each other, which are fitted to the supporting structure (21) in such a way that they can each be rotated around a respective rotational axis (5) which runs along their longitudinal extent in order to pivot the slats (1) between a closed position and an open position,
    wherein the slats (1) each have a transparent, flat covering element (2) with a longitudinal extent, two longitudinal sides (2a, 2b) running along the longitudinal extent, and a width (b), the width (b) being shorter than the longitudinal extent, and each slat (1) also having at least one partially opaque, flat shading element (6) with a corresponding longitudinal extent and a corresponding height (h), the corresponding longitudinal extent of which extends along at least part of the length of the longitudinal extent of the transparent, flat covering element (2), and which is fixed to the transparent, flat covering element (2) with a first longitudinal side (6a), and a second longitudinal side (6b) of the at least one partially opaque, flat shading element (6) opposite the first longitudinal side (6a) protrudes from the transparent, flat covering element (2),
    wherein the at least one partially opaque, flat shading element (6) is positioned in its areal extent at an angle (α) with respect to a corresponding areal extent of the transparent, flat covering element (2),
    wherein the transparent, flat covering elements (2) of the slats (1) have a sealing profile (23a; 23b; 2c) on at least one of their first and second longitudinal sides (2a, 2b),
    wherein the position of the partially opaque, flat shading elements (6) on transparent, flat covering elements (2), and the corresponding height (h) of the partially opaque, flat shading elements (6), and the width (b) of the transparent, flat covering elements (2), are coordinated in such a way that the slats (1), from a first closed position, in which sealing profiles (23a) on corresponding first longitudinal sides (2a) of the transparent, flat covering elements (2) of the slats (1) interlock with corresponding sealing profiles (23b) on corresponding second longitudinal sides (2b) of the transparent, flat covering elements (2) of their respective neighboring slats (1), or
    in which lip seals (2c) running along the corresponding first longitudinal sides (2a) and/or the corresponding second longitudinal sides (2b) of the transparent, flat covering elements (2) of the slats (1) lie on the corresponding second longitudinal sides (2b) or on the corresponding first longitudinal sides (2a) of the transparent, flat covering elements (2) of their respective neighboring slats (1), and the partially opaque, flat shading elements (6) are fixed to an outer side of the transparent, flat covering elements (2) and protrude upwards from them, can be rotated around their rotational axes (5) into a second closed position in which the corresponding second longitudinal sides (6b) of the partially opaque, flat shading elements (6) of the slats (1) are in contact with the corresponding sealing profiles (23b) on the corresponding second longitudinal sides (2b) of the transparent, flat covering elements (2) of their respective neighboring slats (1).

\* \* \* \* \*